US012683934B2

(12) United States Patent
Han et al.

(10) Patent No.: US 12,683,934 B2
(45) Date of Patent: Jul. 14, 2026

(54) SECURE WEB PROXY AND TEMPORARY PASSCODE FOR SSL EXEMPTED SESSION-BASED AUTHENTICATION

(71) Applicant: Fortinet, Inc., Sunnyvale, CA (US)

(72) Inventors: Feng Han, Burnaby (CA); Ying Li Wang, Burnaby (CA); Wenping Luo, Burnaby (CA); Yidong Wei, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 83 days.

(21) Appl. No.: 18/934,012

(22) Filed: Oct. 31, 2024

(65) Prior Publication Data

US 2026/0122040 A1 Apr. 30, 2026

(51) Int. Cl.
*H04L 9/40* (2022.01)
(52) U.S. Cl.
CPC ........ *H04L 63/0281* (2013.01); *H04L 63/029* (2013.01); *H04L 63/0838* (2013.01)
(58) Field of Classification Search
None
See application file for complete search history.

(56) References Cited

U.S. PATENT DOCUMENTS

| | | | | |
|---|---|---|---|---|
| 8,332,464 B2 * | 12/2012 | Dispensa | ............ | H04L 63/0272 |
| | | | | 709/229 |
| 10,536,436 B1 * | 1/2020 | Barbour | .............. | H04L 63/0838 |
| 11,153,280 B1 * | 10/2021 | Walwadkar | ........... | H04L 63/166 |
| 12,218,914 B2 * | 2/2025 | Niranjan | ............. | H04L 61/4511 |

| | | | | |
|---|---|---|---|---|
| 2017/0223054 A1 * | 8/2017 | Wing | .................. | H04L 63/0281 |
| 2020/0186500 A1 * | 6/2020 | Neystadt | ................. | H04L 67/02 |
| 2020/0186501 A1 * | 6/2020 | Neystadt | ................. | H04L 63/08 |

(Continued)

FOREIGN PATENT DOCUMENTS

| | | | |
|---|---|---|---|
| CN | 103259663 | * | 8/2013 |
| CN | 111193698 | * | 5/2020 |

(Continued)

OTHER PUBLICATIONS

Oppliger et al., "SSL/TLS Session-Aware User Authentication", ISSN (Electronic): 1558-0814, Computer (vol. 41, Issue: 3, 2008, pp. 59-65), May 2008 (Year: 2008).*

(Continued)

*Primary Examiner* — Piotr Poltorak
(74) *Attorney, Agent, or Firm* — Jaffery Watson Hamilton & DeSanctis LLP

(57) ABSTRACT

Approaches to providing endpoint client authentication and application access control in a zero-trust network access (ZTNA) environment are described. A secure session is generated with a secure web proxy based on a request from a browser, wherein the request corresponds to a user and requests access to a server. A secure tunnel is established between the secure web proxy and the browser. A web proxy address corresponding to the user is generated. The user is identified based on a handshake procedure with the secure web proxy. A temporary passcode is generated for the user to be used for access to the server. The temporary passcode is sent to an email address associated with the user. The server is caused to authenticate the user utilizing the temporary passcode to allow the user access to the server if the temporary passcode is approved.

20 Claims, 11 Drawing Sheets

GENERATE A SECURE SESSION WITH A SECURE WEB PROXY BASED ON A REQUEST FROM A BROWSER, WHEREIN THE REQUEST CORRESPONDS TO A USER AND REQUESTS ACCESS TO A SERVER 402

↓

ESTABLISH A SECURE TUNNEL BETWEEN THE SECURE WEB PROXY AND THE BROWSER 404

↓

GENERATE A WEB PROXY ADDRESS CORRESPONDING TO THE USER 406

↓

IDENTIFY THE USER BASED ON A HANDSHAKE PROCEDURE WITH THE SECURE WEB PROXY 408

↓

GENERATE A TEMPORARY PASSCODE FOR THE USER TO BE USED FOR ACCESS TO THE SERVER 410

↓

SEND THE TEMPORARY PASSCODE TO AN EMAIL ADDRESS ASSOCIATED WITH THE USER 412

↓

CAUSE THE SERVER TO AUTHENTICATE THE USER UTILIZING THE TEMPORARY PASSCODE TO ALLOW THE USER ACCESS TO THE SERVER IF THE TEMPORARY PASSCODE IS APPROVED 414

(56)                    References Cited

U.S. PATENT DOCUMENTS

| | | | | |
|---|---|---|---|---|
| 2025/0023915 A1* | 1/2025 | Koikara | .............. | H04L 63/0281 |
| 2025/0274437 A1* | 8/2025 | Emeigh | .............. | H04L 63/0236 |

FOREIGN PATENT DOCUMENTS

| | | | | |
|---|---|---|---|---|
| WO | WO-2005053266 A2 * | 6/2005 | .......... | H04W 12/086 |
| WO | WO-2023007477 A2 * | 2/2023 | .......... | G06F 9/4555 |
| WO | WO-2023187203 A1 * | 10/2023 | .......... | H04L 67/141 |

OTHER PUBLICATIONS

IPCOM000176082D, "Enhanced security web proxy and reverse web proxy", author unknown, Nov. 2008 (Year: 2008).*

Han et al., "Cutting Onions With Others' Hands: A First Measurement of Tor Proxies in the Wild", 978-3-903176-57-7, 2023 IFIP Networking Conference (IFIP Networking) (2023, pp. 1-9), Jun. 2023 (Year: 2023).*

* cited by examiner

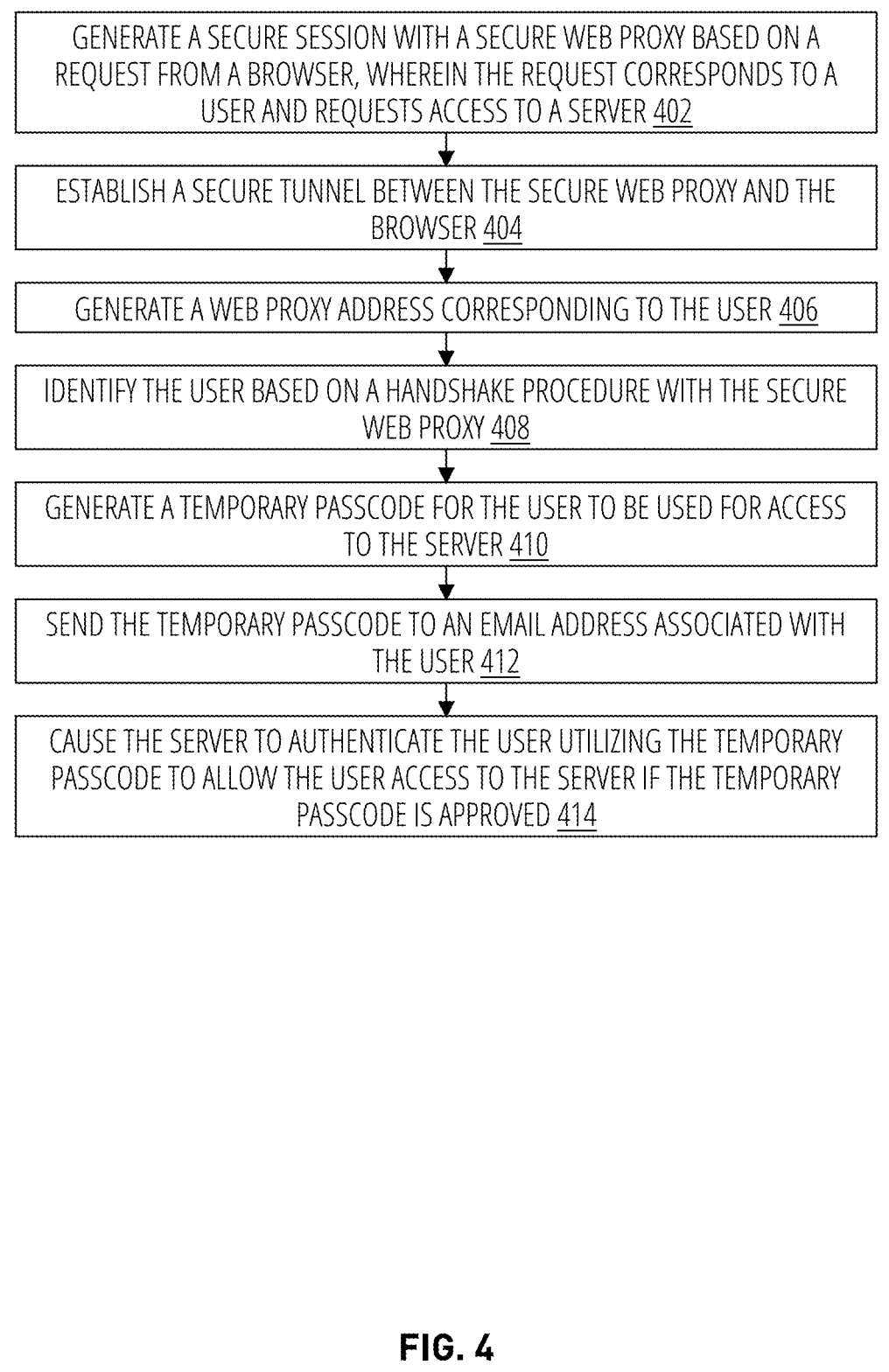

GENERATE A SECURE SESSION WITH A SECURE WEB PROXY BASED ON A REQUEST FROM A BROWSER, WHEREIN THE REQUEST CORRESPONDS TO A USER AND REQUESTS ACCESS TO A SERVER 402

ESTABLISH A SECURE TUNNEL BETWEEN THE SECURE WEB PROXY AND THE BROWSER 404

GENERATE A WEB PROXY ADDRESS CORRESPONDING TO THE USER 406

IDENTIFY THE USER BASED ON A HANDSHAKE PROCEDURE WITH THE SECURE WEB PROXY 408

GENERATE A TEMPORARY PASSCODE FOR THE USER TO BE USED FOR ACCESS TO THE SERVER 410

SEND THE TEMPORARY PASSCODE TO AN EMAIL ADDRESS ASSOCIATED WITH THE USER 412

CAUSE THE SERVER TO AUTHENTICATE THE USER UTILIZING THE TEMPORARY PASSCODE TO ALLOW THE USER ACCESS TO THE SERVER IF THE TEMPORARY PASSCODE IS APPROVED 414

FIG. 4

PROCESSOR(S) 504

INSTRUCTIONS TO GENERATE A SECURE SESSION WITH A SECURE WEB PROXY BASED ON A REQUEST FROM A BROWSER, WHEREIN THE REQUEST CORRESPONDS TO A USER AND REQUESTS ACCESS TO A SERVER 508

INSTRUCTIONS TO ESTABLISH A SECURE TUNNEL BETWEEN THE SECURE WEB PROXY AND THE BROWSER 510

INSTRUCTIONS TO GENERATE A WEB PROXY ADDRESS CORRESPONDING TO THE USER 512

INSTRUCTIONS TO IDENTIFY THE USER BASED ON A HANDSHAKE PROCEDURE WITH THE SECURE WEB PROXY 514

INSTRUCTIONS TO GENERATE A TEMPORARY PASSCODE FOR THE USER TO BE USED FOR ACCESS TO THE SERVER 516

INSTRUCTIONS TO SEND THE TEMPORARY PASSCODE TO AN EMAIL ADDRESS ASSOCIATED WITH THE USER 518

INSTRUCTIONS TO CAUSE THE SERVER TO AUTHENTICATE THE USER UTILIZING THE TEMPORARY PASSCODE TO ALLOW THE USER ACCESS TO THE SERVER IF THE TEMPORARY PASSCODE IS APPROVED 520

NON-TRANSITORY COMPUTER-READABLE STORAGE MEDIUM 506

SYSTEM 502

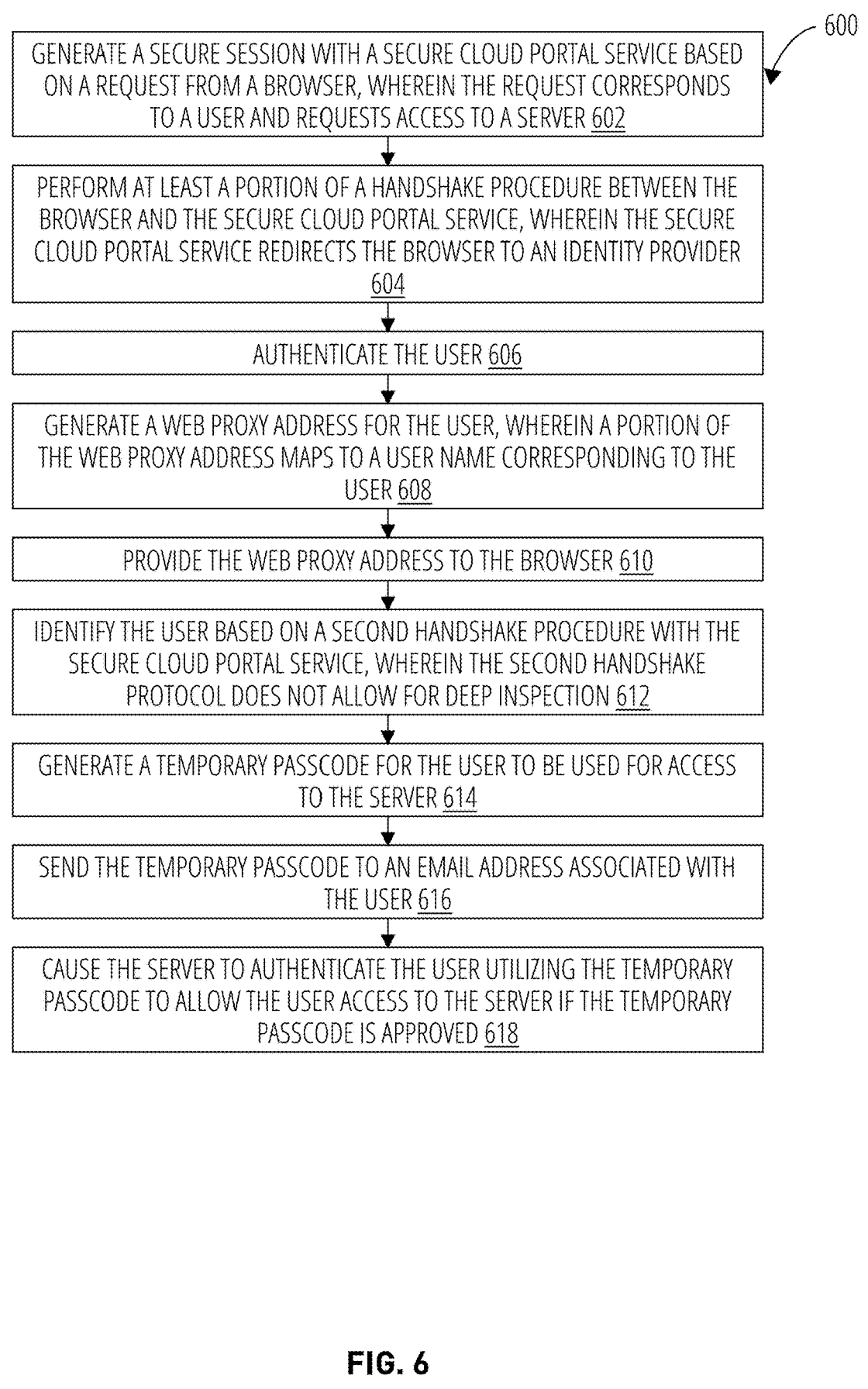

GENERATE A SECURE SESSION WITH A SECURE CLOUD PORTAL SERVICE BASED ON A REQUEST FROM A BROWSER, WHEREIN THE REQUEST CORRESPONDS TO A USER AND REQUESTS ACCESS TO A SERVER 602

PERFORM AT LEAST A PORTION OF A HANDSHAKE PROCEDURE BETWEEN THE BROWSER AND THE SECURE CLOUD PORTAL SERVICE, WHEREIN THE SECURE CLOUD PORTAL SERVICE REDIRECTS THE BROWSER TO AN IDENTITY PROVIDER 604

AUTHENTICATE THE USER 606

GENERATE A WEB PROXY ADDRESS FOR THE USER, WHEREIN A PORTION OF THE WEB PROXY ADDRESS MAPS TO A USER NAME CORRESPONDING TO THE USER 608

PROVIDE THE WEB PROXY ADDRESS TO THE BROWSER 610

IDENTIFY THE USER BASED ON A SECOND HANDSHAKE PROCEDURE WITH THE SECURE CLOUD PORTAL SERVICE, WHEREIN THE SECOND HANDSHAKE PROTOCOL DOES NOT ALLOW FOR DEEP INSPECTION 612

GENERATE A TEMPORARY PASSCODE FOR THE USER TO BE USED FOR ACCESS TO THE SERVER 614

SEND THE TEMPORARY PASSCODE TO AN EMAIL ADDRESS ASSOCIATED WITH THE USER 616

CAUSE THE SERVER TO AUTHENTICATE THE USER UTILIZING THE TEMPORARY PASSCODE TO ALLOW THE USER ACCESS TO THE SERVER IF THE TEMPORARY PASSCODE IS APPROVED 618

FIG. 6

PROCESSOR(S) 704

INSTRUCTIONS TO GENERATE A SECURE SESSION WITH A SECURE CLOUD PORTAL SERVICE BASED ON A REQUEST FROM A BROWSER, WHEREIN THE REQUEST CORRESPONDS TO A USER & REQUESTS ACCESS TO A SERVER 708

INSTRUCTIONS TO PERFORM AT LEAST A PORTION OF A HANDSHAKE PROCEDURE BETWEEN THE BROWSER AND THE SECURE CLOUD PORTAL SERVICE AND REDIRECT THE BROWSER TO AN IDENTITY PROVIDER 710

INSTRUCTIONS TO AUTHENTICATE THE USER 712

INSTRUCTIONS TO GENERATE A WEB PROXY ADDRESS FOR THE USER THAT MAPS TO A USER NAME CORRESPONDING TO THE USER 714

INSTRUCTIONS TO PROVIDE THE WEB PROXY ADDRESS TO THE BROWSER 716

INSTRUCTIONS TO IDENTIFY THE USER BASED ON A SECOND HANDSHAKE PROCEDURE THAT DOES NOT ALLOW FOR DEEP INSPECTION 718

INSTRUCTIONS TO GENERATE A TEMPORARY PASSCODE FOR THE USER 720

INSTRUCTIONS TO SEND THE TEMPORARY PASSCODE TO AN EMAIL ADDRESS ASSOCIATED WITH THE USER 722

INSTRUCTIONS TO CAUSE THE SERVER TO AUTHENTICATE THE USER UTILIZING THE TEMPORARY PASSCODE TO ALLOW THE USER ACCESS TO THE SERVER IF THE TEMPORARY PASSCODE IS APPROVED 724

NON-TRANSITORY COMPUTER-READABLE STORAGE MEDIUM 706

SYSTEM 702

FIG. 7

SECURE WEB PROXY AND TEMPORARY PASSCODE FOR SSL EXEMPTED SESSION-BASED AUTHENTICATION

BACKGROUND

A web proxy allows users to browse anonymously and unblock some websites without installing software, like a virtual private network (VPN). In a web proxy environment, session-based authentication is generally superior to Internet Protocol (IP)-based authentication. This is because relying on a single source network address translation (SNAT) IP authentication can cause cross-session user data contamination. The primary challenge with session-based authentication lies in how the web proxy extracts user information from a session.

Terms and Definitions

Brief definitions of terms used throughout this application are given below.

The term "client" generally refers to an application, program, process, or device in a client/server relationship that requests information or services from another program, process, or device (a server) on a network. Importantly, "client" and "server" are relative since an application may be a client to one application but a server to another. The term "client" also encompasses software that makes the connection between a requesting application, program, process, or device to a server possible, such as a file transfer protocol (FTP) client.

The phrase "endpoint protection platform" generally refers to cybersecurity monitoring and/or protection functionality performed on behalf of an endpoint (or client) device. In one embodiment, the endpoint protection platform can be deployed in the cloud or on-premises and supports multi-tenancy. The endpoint protection platform may include a kernel-level Next Generation AntiVirus (NGAV) engine with machine learning features that prevent infection from known and unknown threats and leverage code-tracing technology to detect advanced threats such as in-memory malware. The endpoint protection platform may provide monitoring and/or protection functionality on behalf of the endpoint device via an agent, which may be referred to herein as an "endpoint security agent" deployed on the endpoint device. Non-limiting examples of an endpoint protection platform include the FORTIEDR Software as a Service (SaaS) platform and the FORTICLIENT integrated endpoint protection platform available from Fortinet, Inc. of Sunnyvale, CA. In some examples, the endpoint protection platform is a participant in a cybersecurity mesh architecture (CSMA) in which various cybersecurity products/solutions/tools of a given cybersecurity or networking security vendor or across a group of participating vendors achieve a more integrated security policy by facilitating interoperability and communication among the various cybersecurity products/solutions/tools (e.g., network security appliances, a secure access service edge (SASE) platform, etc.).

The phrase "endpoint security agent" generally refers to endpoint software that runs on an endpoint device (e.g., a desktop computer, a laptop computer, or a mobile device) and monitors for cybersecurity issues arising on the endpoint device and/or protects the endpoint device against cybersecurity issues. In some examples, the endpoint security agent may be deployed on the endpoint device as a fabric agent that delivers protection, compliance, and secure access in a single, modular, lightweight client. A fabric agent may be endpoint software that runs on an endpoint device and communicates with a telemetry connection or a cybersecurity mesh (e.g., the Fortinet Security Fabric available from Fortinet, Inc. of Sunnyvale, CA) to provide information, visibility, and control to that device. In some examples, the endpoint security agent may be in the form of a lightweight endpoint agent that utilizes less than one percent of CPU and less than 100 MB of RAM and may leverage, among other things, various security event classification sources provided within one or more associated cloud-based security services.

A non-limiting example of an endpoint security agent is the FORTICLIENT Fabric Agent available from Fortinet, Inc. of Sunnyvale, CA. In one example, to simplify the initial deployment and offload ongoing monitoring, an endpoint security agent may be managed and/or supported by one or more endpoint-focused managed services, for example, to provide setup, deployment, configuration, vulnerability monitoring, and overall endpoint security monitoring. In the context of a CSMA, the endpoint security agent may communicate with an endpoint protection platform, one or more network security appliances, and/or one or more cloud-based security services via a telemetry connection and/or via application programming interface (API) integration. In some examples, the endpoint security agent enables remote workers to connect to the network using zero-trust principles securely and may enable both Universal ZTNA and Virtual Private Network (VPN)-encrypted tunnels, as well as URL filtering and cloud access security broker (CASB). The endpoint security agent may additionally provide enhanced security capabilities through artificial intelligence (AI)-based NGAV, endpoint quarantine, and application firewall, as well as support for cloud sandbox, USB device control, and ransomware protection.

As used herein, a "network security appliance" or a "network security device" generally refers to a device or appliance in virtual or physical form that is operable to perform one or more security functions. A network security device may reside within the particular network that it is protecting, or network security may be provided as a service with the network security device residing in the cloud. Some network security devices may be implemented as general-purpose computers or servers with appropriate software to perform one or more security functions. Other network security devices may include custom hardware (e.g., one or more custom Application-Specific Integrated Circuits (ASICs)).

For example, while there are differences among network security device vendors, network security devices may be classified into three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines one or more CPUs, CPs, and NPs. Mid-range network security devices may include one or more multi-core CPUs, one or more separate NP Application-Specific Integrated Circuits (ASICs), and one or more CP ASICs. At the high end, network security devices may have multiple NPs and/or multiple CPs. A network security device is typically associated with a particular network (e.g., a private enterprise network) on behalf of which it provides one or more security functions.

Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data loss prevention (DLP), antispam, antispyware, logging, reputation-based protections, event correlation, network access control, vulnerability management, and the like. Such security functions may be deployed individually as part of a point solution or in various combinations as a unified threat management (UTM) solution. TLS builds on SSL, thus, references to SSL can indicate that the specific functionality referenced is provided by a more recent TLS-based specification.

Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTI-WEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FOR-TISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

As used herein, "Zero-Trust Network Access" or "ZTNA" generally refers to a set of technologies and functionalities that enable secure access to internal applications for local or remote users (e.g., utilizing on-net endpoint or client devices within an enterprise network or off-net endpoint or client devices outside of the enterprise network, respectively). ZTNA represents the evolution of VPN remote access, bringing the zero-trust model to application access. ZTNA may be used to authenticate and authorize access to resources based on identity, device, and/or contextual data. ZTNA solutions typically grant access on a per-session basis to individual applications only after devices and users are verified.

As used herein, a "ZTNA Access Point" or "ZTNA AP" generally refers to any hardware device, software application, or combination of hardware and software that may be used to control access to protected network devices, servers, resources, services, TCP applications, and/or databases by a requesting endpoint device. In some cases, a ZTNA AP runs one or more access proxies, including a TFAP. Depending on the particular implementation, a ZTNA may be provided in virtual or physical form. For example, a ZTNA AP may be a virtual node or container that runs one or more access proxies or a network security appliance (e.g., a UTM appliance) that runs one or more access proxies.

As used herein, a "secure connection" generally refers to a connection provided through a computer network by one or more protocols that secure communication and data transfers via the connection, for example, via end-to-end encryption. Non-limiting examples by which a secure connection may be established include HTTPS, Hypertext Transport Protocol version 1.1 (HTTP 1.1) over SSL, Hypertext Transfer Protocol version 2.0 (HTTP 2.0) over SSL, Hypertext Transfer Protocol version 3.0 (HTTP 3.0) over Quick User Datagram Protocol (UDP) Internet Connections (QUIC).

A "computer" or "computer system" may be one or more physical computers, virtual computers, or computing devices. As an example, a computer may be one or more server computers, cloud-based computers, cloud-based clusters of computers, virtual machine instances, or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers unless expressly stated otherwise.

The terms "connected" or "coupled", and related terms are used in an operational sense and are not necessarily limited to a direct connection or coupling. Thus, for example, two devices may be coupled directly or via one or more intermediary media or devices. As another example, devices may be coupled so that information can be passed between them without sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," "in an example," "in some examples," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

BRIEF DESCRIPTION OF THE DRAWINGS

To easily identify the discussion of any particular element or act, the most significant digit or digits in a reference number refer to the figure number in which that element is first introduced.

FIG. 4 illustrates an example flow diagram of an approach to providing endpoint client authentication and application access control in a secure web proxy zero-trust network access (ZTNA) environment.

FIG. 5 is an example of a system to provide endpoint client authentication and application access control in a secure web proxy zero-trust network access (ZTNA) environment.

FIG. 6 illustrates an example flow diagram of an approach to providing endpoint client authentication and application access control in a secure cloud portal service zero-trust network access (ZTNA) environment.

FIG. 7 is an example of a system to provide endpoint client authentication and application access control in a secure cloud portal service zero-trust network access (ZTNA) environment.

DETAILED DESCRIPTION

Figure 1:
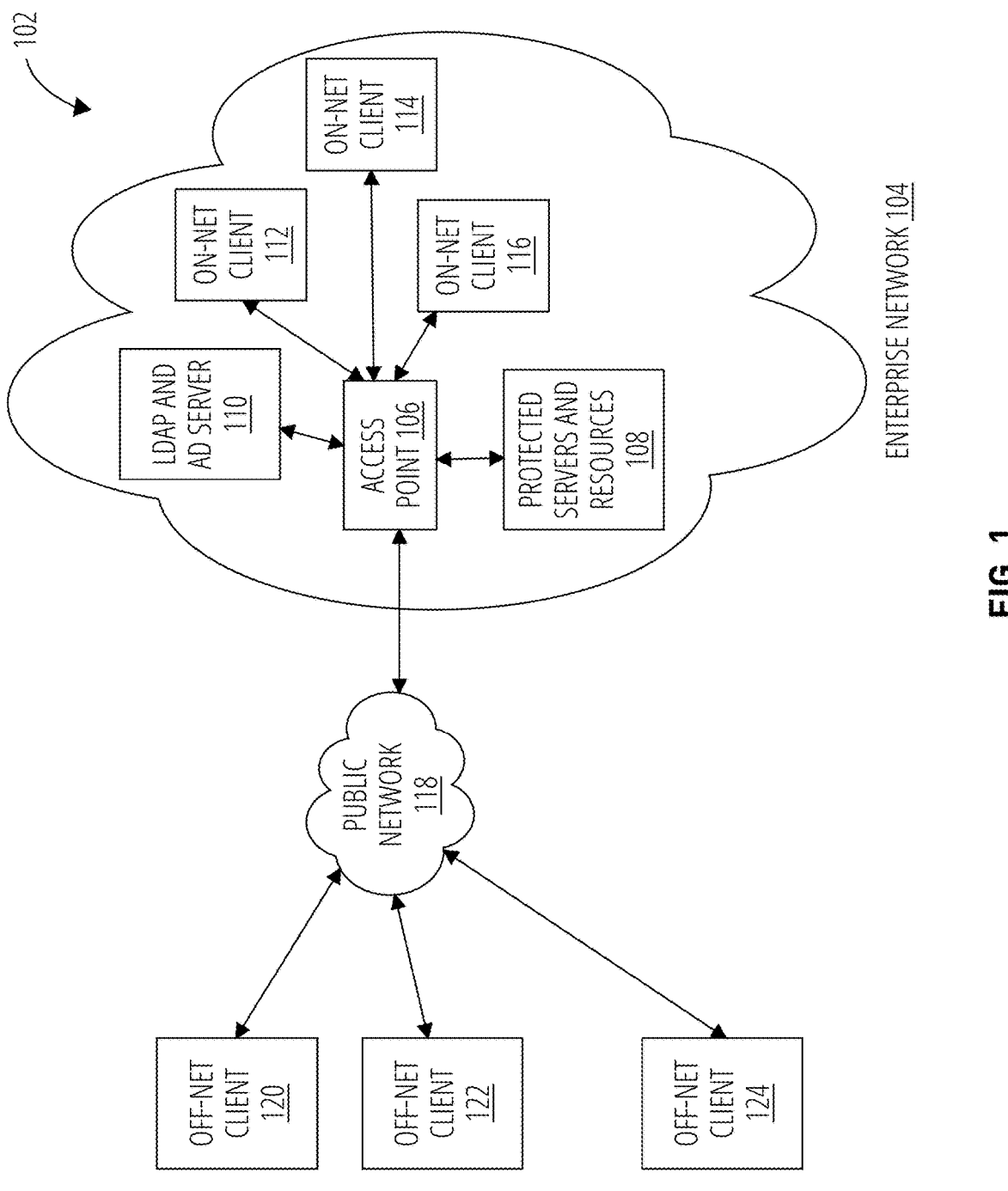
FIG. 1 is a block diagram of an architecture that can provide endpoint client authentication and application access control in a zero-trust network access (ZTNA) environment.

As described in greater detail below, various approaches that focus on mechanisms to provide secure socket layer (SSL)-exempted session-based authentication are provided. Currently, the main approaches include 1) utilizing authentication methods that leverage a HyperText Transfer Protocol (HTTP) Proxy-Authorization header to transmit user information, such as Basic, Form, Kerberos, or New Technology LAN Manager (NTLM) authentication, or 2) using HTTP cookies for session management, as seen in security assertion markup language (SAML)-based authentication or through an authentication portal. Kerberos and NTLM authentication are safe methods even with plain text. But they can make the deployment and configuration more complicated, and that might be challenging for customers in practice.

Kerberos is a computer-network authentication protocol developed by the Massachusetts Institute of Technology (MIT) that works on the basis of tickets to allow nodes communicating over a non-secure network to prove their identity to one another in a secure manner. Kerberos protocol messages are protected against eavesdropping and replay attacks. Kerberos builds on symmetric-key cryptography and requires a trusted third party, and optionally may use public-key cryptography during certain phases of authentication.

NTLM is a suite of security protocols available from Microsoft, Inc. intended to provide authentication, integrity, and confidentiality. The NTLM protocol suite is implemented in a Security Support Provider, which combines the LAN Manager authentication protocol, NTLMv1, NTLMv2 and NTLM2 Session protocols in a single package. Whether these protocols are used or can be used on a system, which is governed by Group Policy settings, for which different versions of Windows have different default settings. NTLM passwords are considered weak because they can be brute forced with modern hardware.

One popular cookie-based authentication method is Security Assertion Markup Language (SAML), which is an open standard for exchanging authentication and authorization data between parties, in particular, between an identity provider and a service provider. SAML is an XML-based markup language for security assertions (statements that service providers use to make access-control decisions). SAML supports Single Sign-On (SSO) and is entirely based on the HTTP protocol, making it seamless for the end user.

In a SAML setup, the user database (Identity Provider, or IdP) and the Web Proxy (Service Provider, or SP) are separate entities, meaning the web proxy does not need to handle user credentials directly. Because an HTTP CONNECT request cannot carry a Cookie, SSL deep inspection would be mandatory for all cookie-based authentications. Deep inspection or deep packet inspection (DPI) is a type of data processing that inspects in detail data sent over a network, and may include alerting, blocking, re-routing, and/or logging. Deep packet inspection is often used for baselining application behavior, analyzing network usage, troubleshooting network performance, ensuring that data is in the correct format, checking for malicious code, checking for eavesdropping, etc. The CONNECT method requests that an intermediary establish a TCP/IP tunnel to the origin server identified by the request target. It is often used to secure connections through one or more HTTP proxies.

If one session cannot use SSL deep inspection, for example, most of banking web sites are SSL deep-inspection exempted in a typical web proxy deployment, then we cannot use SAML for the web sites. HTTP cookie has another limitation that is caused by the so-called third-party cookie prevention, which means the browser will prevent web proxy from setting a cookie if the accessing website is an embedded web resource (e.g. CDN resources). As a result, the sessions to these resources will not pass the SAML authentication.

Workarounds for the limitations currently include 1) downgrading session-based authentication to IP-based authentication, resulting in shared user sessions and 2) downgrading the session to be authentication-exempted, meaning no user authentication is required. Downgrading authentication procedures in a secure environment is not an ideal solution.

As described in greater detail below, approaches are described that support use of secure web proxy that starts with a SSL session, and the CONNECT request is inside the SSL tunnel. Then a specific web proxy FQDN is generated for each user. With that, the system can identify the user by SSL SNI. To verify the user, the web proxy will use email to send a temporary passcode to the user. The user can input the username and the passcode when web proxy challenges with Basic method. Since Basic method is also safe with secure web proxy, web proxy can securely get the user information from HTTP CONNECT request and finish the session-based authentication and find the user that is authenticated by SAML. This approach can be used for traditional secure web proxy applications (e.g., FIG. 2A, FIG. 2B) and for cloud-based proxy applications (e.g., FIG. 3A, FIG. 3B).

In an example, users share the same web proxy Fully Qualified Domain Name (FQDN), which is a complete address that specifies its location in the Internet domain name system. The FQDN includes the hostname and domain name, which uniquely identify a specific computer or server. After web proxy finishes SAML authentication for a session with SSL deep inspection (e.g. non-banking sites), and extracts out the username, groups and email, web proxy will generate the passcode and send it to the user by email. When web proxy gets a new CONNECT request to an SSL exempted site, and tries to get the user for the session, the web proxy will generate HTTP 407 with Authorization Scheme 'Basic' with a message to ask the user to input the user name and passcode. The end user can input the username and passcode received in email and passes the authentication.

The approaches described can remove the dependency of HTTP cookies from session-based SAML authentication using a Web Proxy. These approaches will provide a reliable method for session-based authentication for HTTPS traffic without SSL deep inspection.

FIG. 1 is a block diagram illustrating operating environment 102 in which various embodiments of the present disclosure may be employed. In the context of the present example, multiple off-net clients (e.g., off-net client 120, off-net client 122, off-net client 124) access enterprise network 104 via public network 118 (e.g., the Internet). The off-net clients may represent endpoint or client devices (e.g., workstations, desktop computers, laptop computers, or mobile devices) used by remote workers associated with a particular organization or enterprise.

In an example, enterprise network 104 includes Lightweight Directory Access Protocol (LDAP) and Active Directory (AD) (LDAP and AD) server 110, access point 106, protected servers and resources 108, and multiple on-net clients (e.g., on-net client 112, on-net client 114, on-net client 116). In an example, the on-net clients are locally attached client devices used by onsite workers. In an example, access point 106 is a network security appliance operable within enterprise network 104. Access point 106 may be responsible for controlling access to protected servers and resources 108, which may include various protected network devices, servers, resources, services, TCP applications, and/or databases. For example, as is known in the art, access point 106 may evaluate policies to determine what devices and users can access a given target service of protected servers and resources 108.

In an example, when a given user session matches a policy, access point 106 may set up a proxy tunnel session (e.g., a TFAP tunnel) between an endpoint security agent (not shown), running on a requesting endpoint device (e.g., one of the off-net clients or one of the on-net clients) and acting as a proxy on behalf of a client application (e.g., a browser), and the target service. In some cases, the evaluation of the policies may include consulting LDAP and AD server 110 regarding a user's AD group and/or domain. For example, access to one or more of protected servers and resources 108 may be limited to a requesting endpoint that belongs to AD. In some examples, access to certain Virtual Local Area Networks (VLANs) may be based on the logged in user's AD group membership. Deny policies can be used with endpoints when they fall outside of security posture policies; for example, access may be denied to certain resources or network segments if an endpoint is tagged with critical vulnerabilities.

One or more components illustrated in FIG. 1 can utilize Zero-Trust Network Access (ZTNA) technologies and functionalities that enable secure access to internal applications for local or remote users (e.g., utilizing on-net endpoint or client devices within an enterprise network or off-net endpoint or client devices outside of the enterprise network, respectively). ZTNA may be used to authenticate and authorize access to resources based on identity, device, and/or contextual data. ZTNA solutions typically grant access on a per-session basis to individual applications only after devices and users are verified.

Figure 2A:
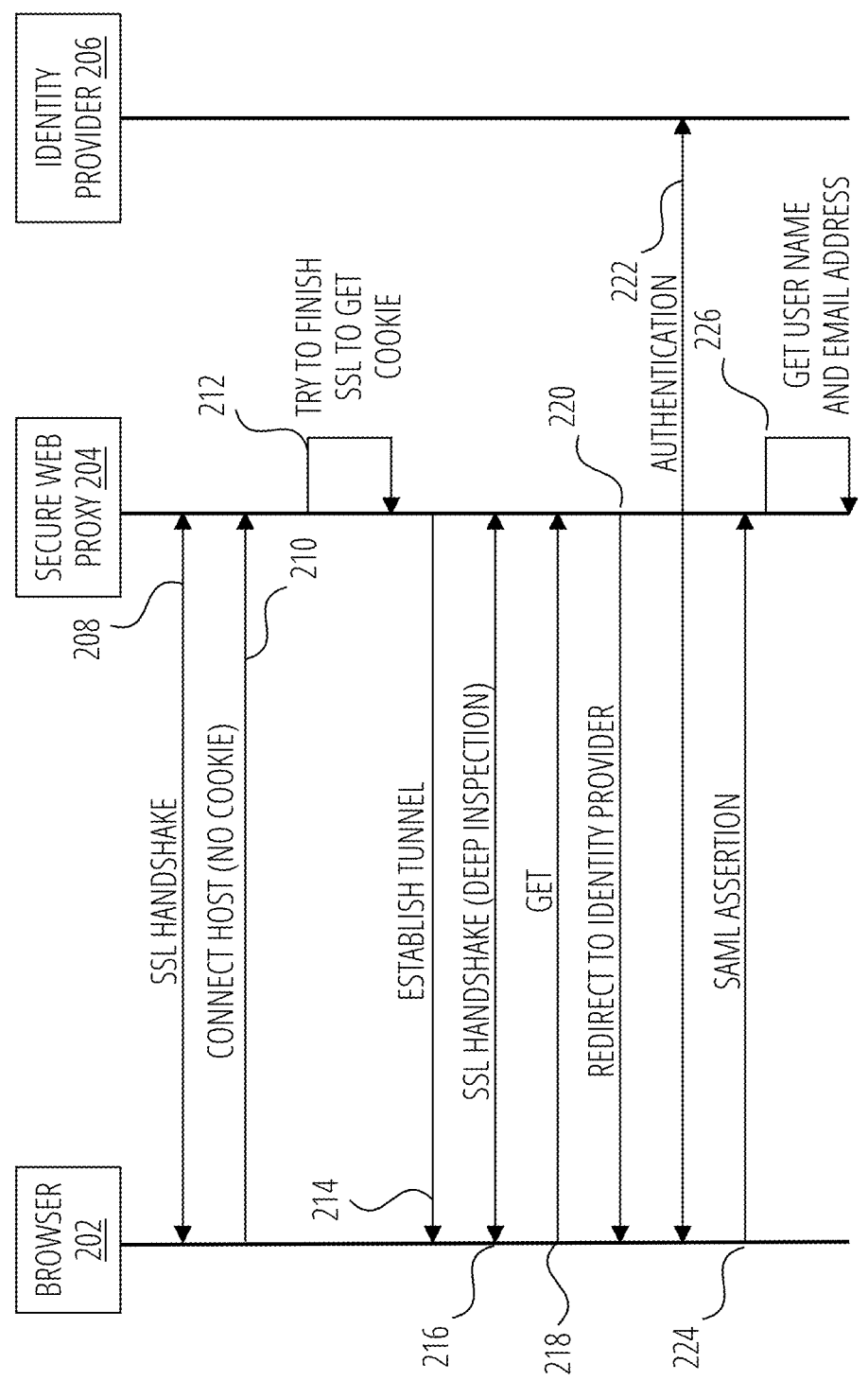
FIG. 2A illustrates an example flow diagram of an approach to providing endpoint client authentication and application access control in a secure web proxy zero-trust network access (ZTNA) environment.
Figure 2B:
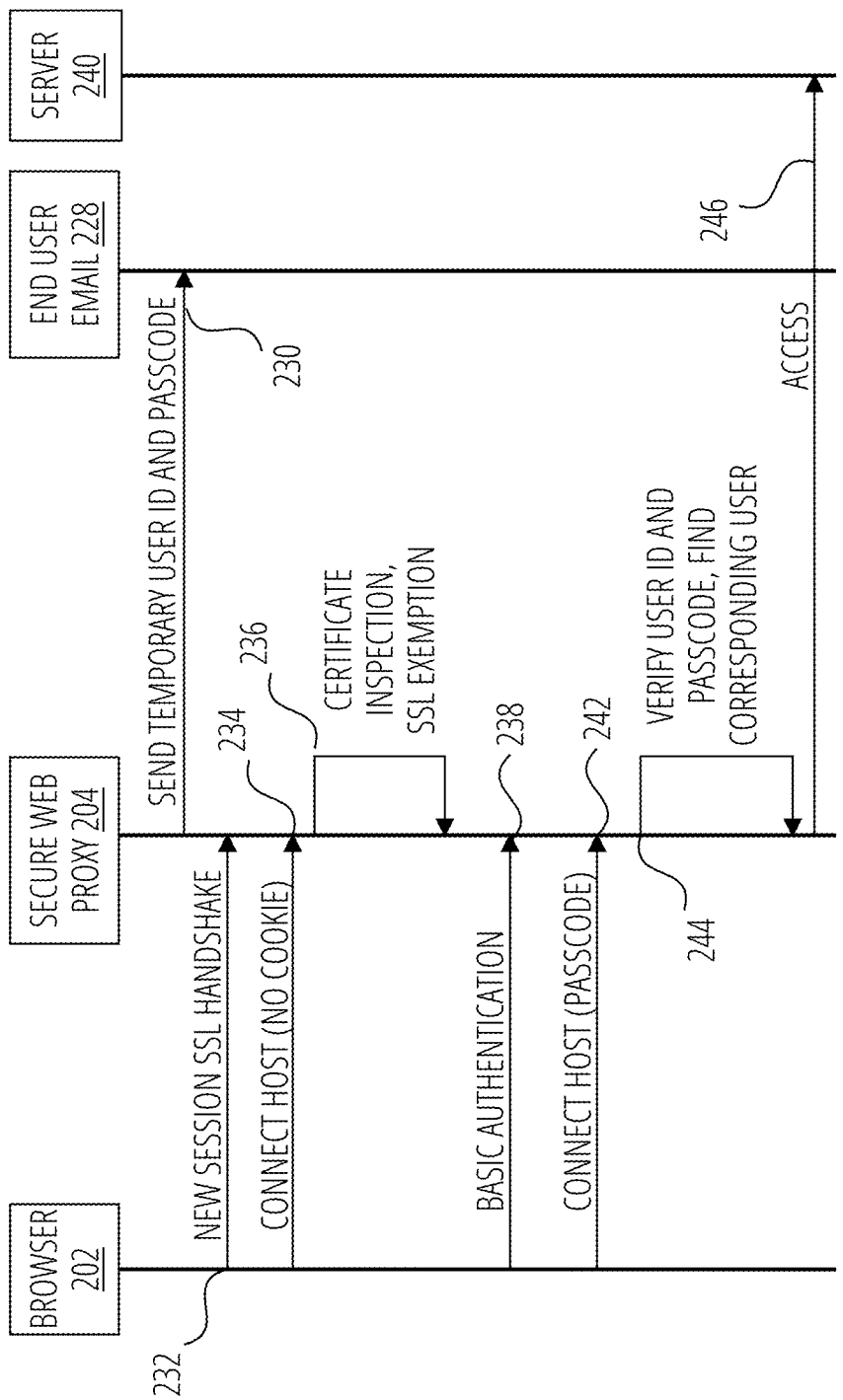
FIG. 2B is a continuation of FIG. 2A and illustrates an example flow diagram of an approach to providing endpoint client authentication and application access control in a secure web proxy zero-trust network access (ZTNA) environment.

FIG. 2A illustrates an example flow diagram of an approach to provide endpoint client authentication and application access control in a secure web proxy zero-trust network access (ZTNA) environment. FIG. 2A in combination with FIG. 2B provides approaches that support use of secure web proxy that starts with a SSL session, and the CONNECT request is inside the SSL tunnel. Then a specific web proxy FQDN is generated for each user. With that, the system can identify the user by SSL SNI. To verify the user, the web proxy will use email to send a temporary passcode to the user. The user can input the username and the passcode when web proxy challenges with Basic method. Because Basic method is also safe with secure web proxy, web proxy can securely get the user information from HTTP CONNECT request and finish the session-based authentication and find the user that is authenticated by SAML.

In an example, users share a web proxy FQDN. After web proxy finishes SAML authentication for a session with SSL deep inspection (e.g. non-banking sites), and extracts out the username, groups and email, web proxy will generate the passcode and send it to the user by email directly. When web proxy gets a new CONNECT request to a SSL exempted site, and tries to get the user for the session, the web proxy will generate HTTP 407 with Authorization Scheme 'Basic' with a message to ask the user to input the user name and passcode. End user can input the username and passcode received in email and passes the authentication.

Turning to the specifics of FIG. 2A, browser 202 and secure web proxy 204 can perform SSL handshake 208. Generally, the handshake authenticates the server (e.g., secure web proxy 204) by its certificate. Upon completion of SSL handshake 208, browser 202 can connect to secure web proxy 204 (e.g., using CONNECT host (no cookie) 210 or a similar command). In an example, in response to CONNECT host (no cookie) 210, secure web proxy 204 try to finish the SSL connection to get a cookie 212 and can establish tunnel 214 with browser 202.

After the tunnel has been established (e.g., establish tunnel 214), an SSL handshake with deep inspection can be performed (e.g., SSL handshake (deep inspection) 216) occurs between browser 202 and secure web proxy 204. After the SSL handshake (e.g., SSL handshake (deep inspection) 216), browser 202 performs an HTTP GET operation (e.g., GET 218) with secure web proxy 204. The HTTP GET method requests that the target resource transfer a representation of its state and/or other data. GET requests only retrieve data and have no other effect.

In response to the HTTP GET, secure web proxy 204 redirects browser 202 to identity provider 206 via redirect to identity provider 220 command. After redirect to identity provider 220, browser 202 and identity provider 206 perform one or more authentication operations (e.g., authentication 222). In response to authentication 222, browser 202 performs SAML assertion 224 with respect to secure web proxy 204. SAML is a protocol that enables single sign-on (SSO) and passes authentication data between identity providers. The SAML assertion is a package with security information about an entity issued by an identity provider to a service provider. In response to SAML assertion 224, secure web proxy 204 will get username and email address 226 for the user that has been authenticated (e.g., authentication 222).

FIG. 2B is a continuation of FIG. 2A and illustrates an example flow diagram of an approach to providing endpoint client authentication and application access control in a secure web proxy zero-trust network access (ZTNA) environment. After performing the operations as described in FIG. 2A, secure web proxy 204 sends temporary user ID and passcode 230 to end user email 228. As described with respect to the remainder of FIG. 2B, temporary user ID and passcode 230 is used to access server 240 using Basic authentication.

After browser 202 initiates new session SSL handshake 232 with secure web proxy 204, browser 202 uses CONNECT host (no cookie) 234 to access secure web proxy 204. In response, secure web proxy 204 performs a certificate inspection and finds an SSL exemption (e.g., certificate inspect and SSL exemption 236) indicating there is no cookie to be used for authentication. Because of the SSL exemption, browser 202 uses basic authentication 238 to access secure web proxy 204. In an example, browser 202 uses CONNECT host (user ID and passcode) 242 to access secure web proxy 204. In response, secure web proxy 204 verifies user ID and passcode, and finds corresponding user 244. When secure web proxy 204 finds the user corresponding to the temporary user ID and passcode, access is granted to server 240 (e.g., server access 246).

Thus, in an example, after secure web proxy 204 finishes SAML authentication for a session with SSL deep inspection, and extracts the username and email, secure web proxy 204 will generate the passcode and send it to the user by email directly (e.g., end user email 228). When secure web proxy 204 gets a new CONNECT request to a SSL exempted site (e.g., CONNECT host (user ID and passcode) 242), and tries to get the user for the session, secure web proxy 204 will generate, for example, an HTTP 407 with Authorization Scheme 'Basic' with a message to ask the user to input the user name and passcode that has been received via end user email 228. The end user can input the username and passcode received via email to pass the authentication and gain access to server 240. This provides enhanced authentication and security as compared to the workaround solutions discussed above.

Figure 3A:
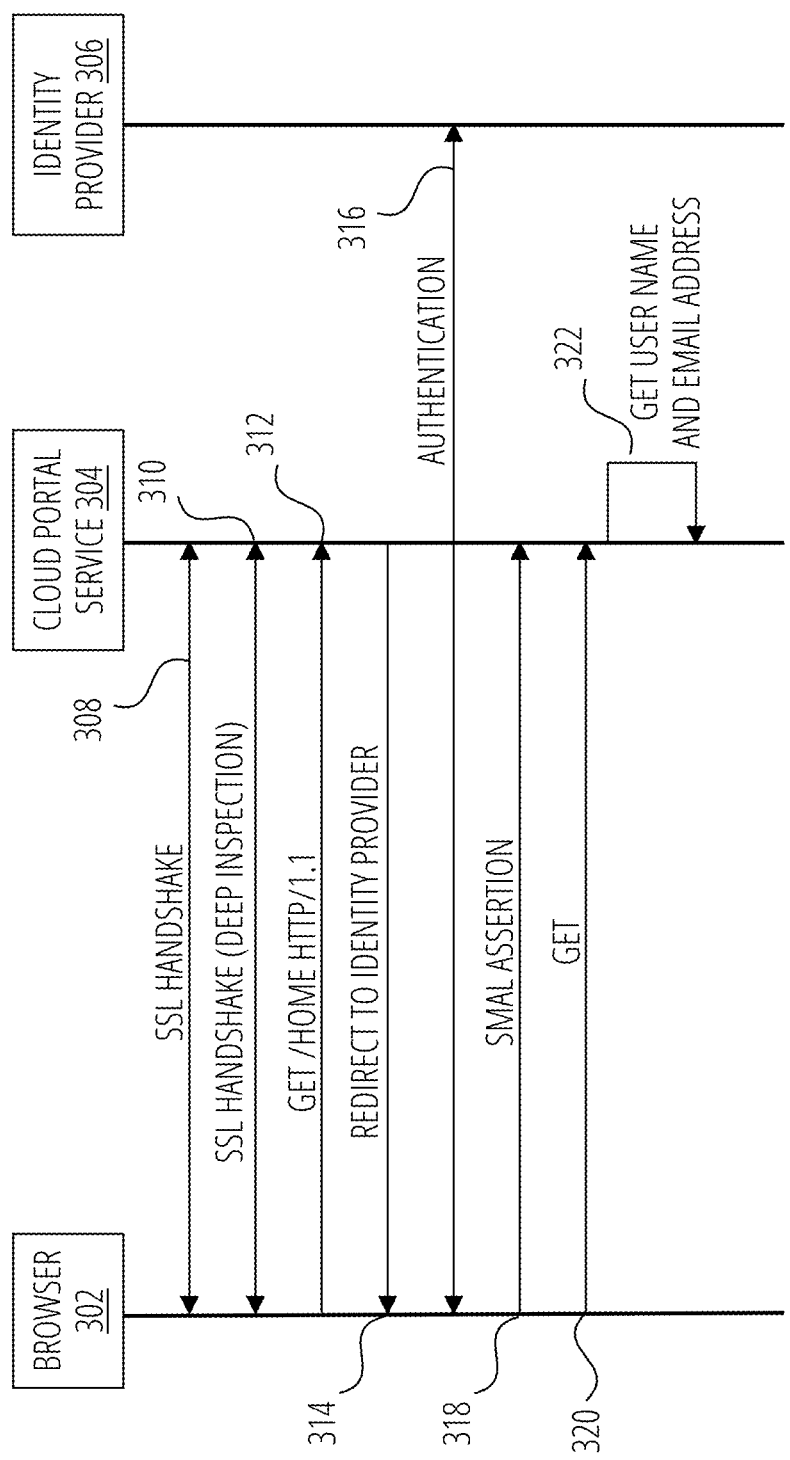
FIG. 3A illustrates an example flow diagram of an approach to providing endpoint client authentication and application access control in a cloud-based web proxy zero-trust network access (ZTNA) environment.

FIG. 3A illustrates an example flow diagram of an approach to providing endpoint client authentication and application access control in a cloud-based web proxy zero-trust network access (ZTNA) environment. In contrast to the web proxy approach described above, FIG. 3A to FIG. 3C illustrates a cloud-based proxy architecture that can provide a web portal to an end user.

In an example, an end user can access cloud portal service 304 using browser 302, cloud portal service 304 will authenticate the user by, for example, SAML-compliant operations. After the authentication (e.g., authentication 316) is done, cloud portal service 304 will notify cloud proxy 324 (in FIG. 3B) about the user information (usually, but not always, they are provided by the same server). In an example, cloud proxy 324 will generate a specific web proxy FQDN for this user, for example, the username is "JacChen," and the FQDN:

https://0c28805-410d-490b.proxy-cloud.com: 8080

The special ID "0c28805-410d-490b" from the FQDN will map to the username. The end user can download the secure web gateway (SWG) proxy auto-configuration (PAC) file Universal Resource Locator (URL) from cloud portal service 304, and then set the URL to the local proxy setting. When cloud proxy 324 gets the PAC file request, the PAC content is generated and the specific proxy FQDN is set according to the current user. When cloud proxy 324 gets a web proxy connection, it can parse out the ID from SSL server name indication (SNI) during the SSL handshake for secure web proxy. If the proxy needs to use SAML authentication, and the session destination is, for example, a banking web site and SSL deep-scan exempted (e.g., certificate inspection, SSL exemption 338 in FIG. 3B), the end user is challenged with an HTTP 407 message (e.g., basic authentication 344 in FIG. 3C) and asked for the passcode. At the same time, the passcode will be sent out to the user by email (e.g., sends temporary passcode to user email 340 in FIG. 3B).

Turning to the specifics of FIG. 3A, in an example, browser 302 and cloud portal service 304 perform SSL handshake 308. In other configurations, a different protocol can be utilized. In an example, the SSL handshake includes SSL handshake (deep inspection) 310, to provide further analysis of the data presented in the handshake using DPI or other techniques.

Upon completion of the handshake (e.g., SSL handshake 308 and/or SSL handshake (deep inspection) 310), browser 302 uses an HTTP GET operation (e.g., GET/home HTTP/1.1 312) with cloud portal service 304. The HTTP GET method requests that the target resource transfer a representation of its state and/or other data. In response to the GET, cloud portal service 304 redirects (e.g., redirect to identity provider 314) browser 302 to identity provider 306.

After redirect to identity provider 314, browser 302 and identity provider 306 perform one or more authentication operations (e.g., authentication 316). In response to authentication 316, browser 302 performs SMAL assertion 318 with respect to cloud portal service 304. SAML is a protocol that enables single sign-on (SSO) and passes authentication data between identity providers. The SAML assertion is a package with security information about an entity issued by an identity provider to a service provider. In response to SMAL assertion 318 and GET 320 from browser 302, cloud portal service 304 will get username and email address 322 for the user that has been authenticated (e.g., authentication 316).

Figure 3B:
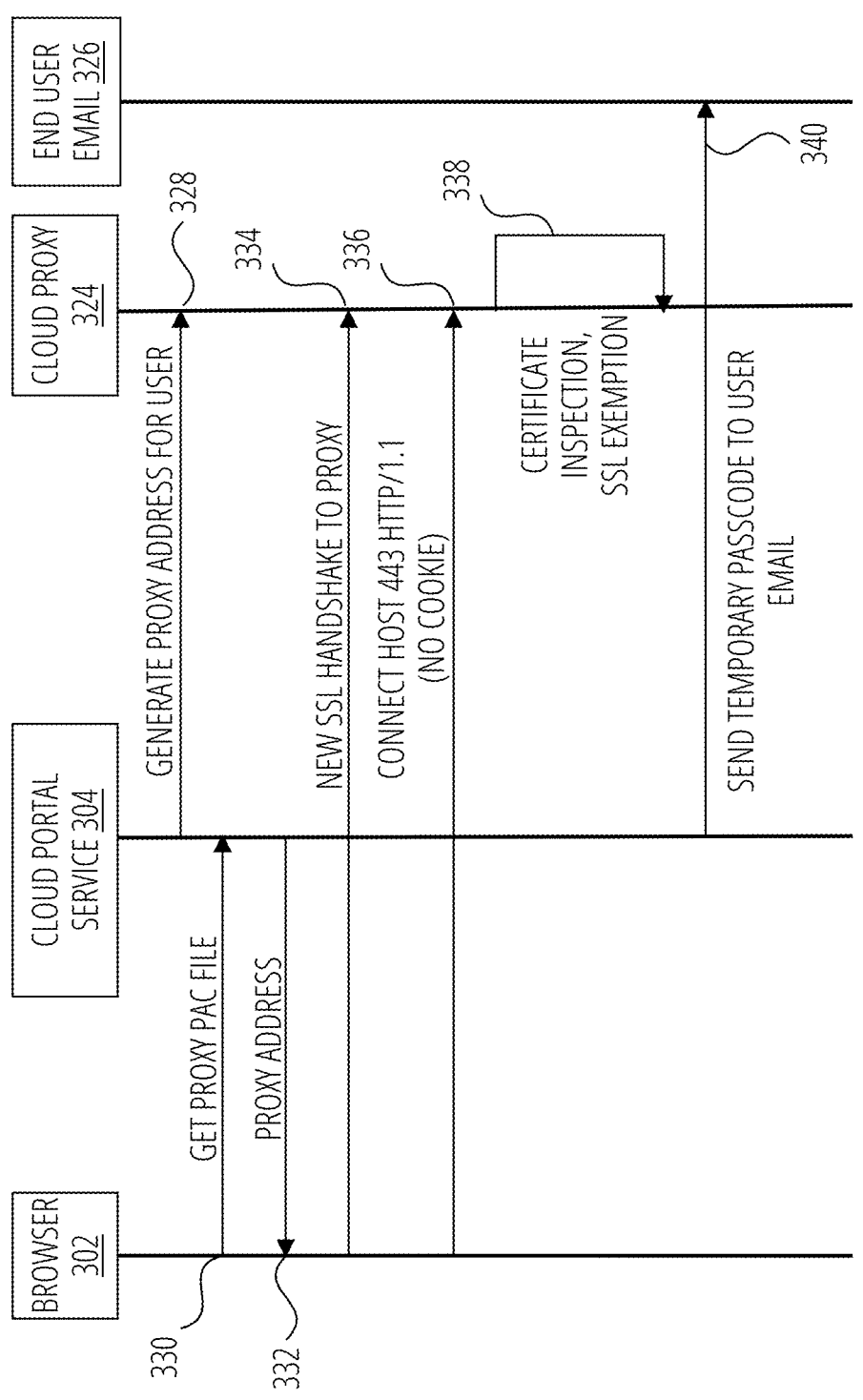
FIG. 3B is a continuation of FIG. 3A and illustrates an example flow diagram of an approach to providing endpoint client authentication and application access control in a cloud-based web proxy zero-trust network access (ZTNA) environment.

FIG. 3B is a continuation of FIG. 3A and illustrates an example flow diagram of an approach to providing endpoint client authentication and application access control in a cloud-based web proxy zero-trust network access (ZTNA) environment. After performing the operations as described in FIG. 3A, cloud portal service 304 generates proxy address for user 328 and sends the proxy address to cloud proxy 324. As described with respect to the remainder of FIG. 3B, browser 302, cloud portal service 304 and cloud proxy 324 interact to generate and sends temporary passcode to user email 340 to end user email 326.

In an example, browser 302 requests the proxy PAC file (e.g., get proxy PAC file for this user 330) from cloud portal service 304. In response, cloud portal service 304 provides proxy address 332 to browser 302. In an example, browser 302 uses the proxy address start a new handshake (334) with cloud proxy 324.

When cloud proxy 324 gets a new CONNECT request to an SSL exempted site (e.g., CONNECT host 443 HTTP/1.1

(no cookie) 336), cloud proxy 324 performs a certificate inspection with SSL exemption 338. Cloud portal service 304 sends temporary passcode to user email 340 to end user email 326.

Figure 3C:
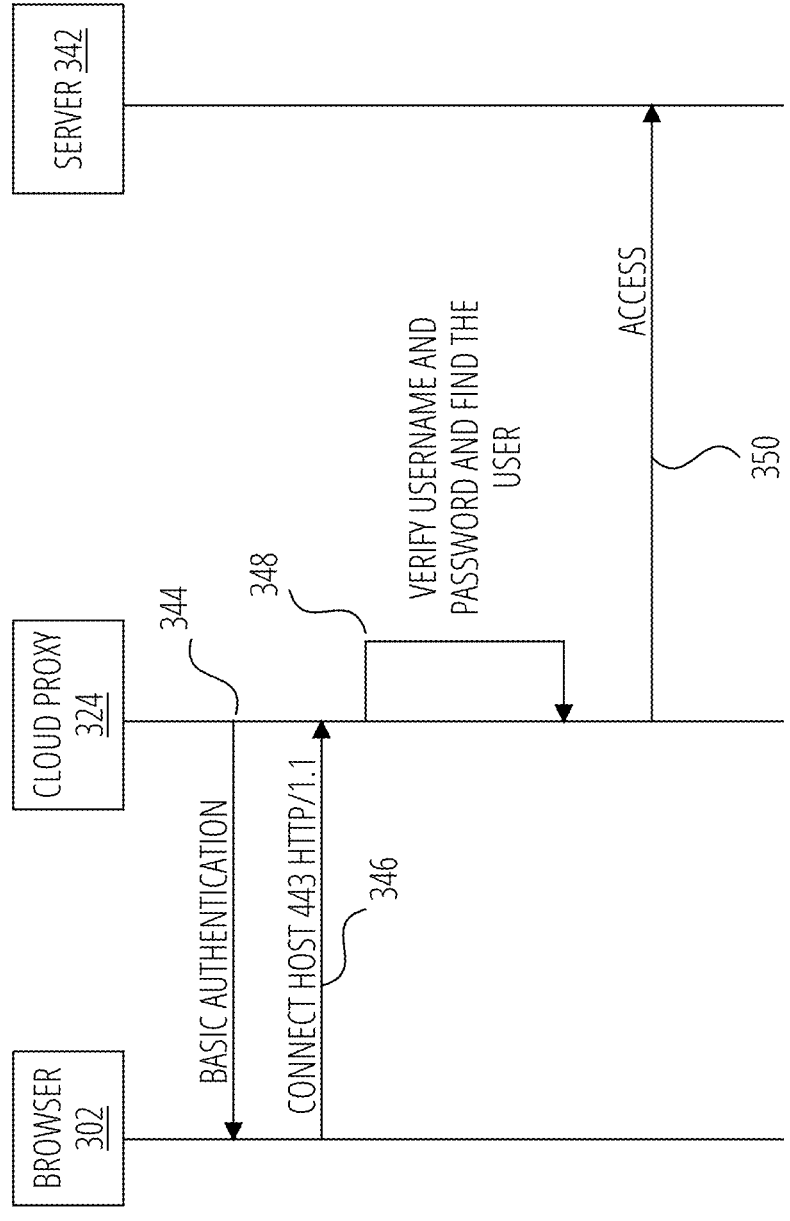
FIG. 3C is a continuation of FIG. 3B and illustrates an example flow diagram of an approach to providing endpoint client authentication and application access control in a cloud-based web proxy zero-trust network access (ZTNA) environment.

FIG. 3C is a continuation of FIG. 3B and illustrates an example flow diagram of an approach to providing endpoint client authentication and application access control in a cloud-based web proxy zero-trust network access (ZTNA) environment. In response to the certificate inspection (e.g., certificate inspection, SSL exemption 338 in FIG. 3B), cloud proxy 324 will generate, for example, an HTTP 407 with Authorization Scheme 'Basic' (e.g., 344). Browser 302 then connects to cloud proxy 324 (e.g., CONNECT host 443 HTTP/1.1 (with username and passcode) 346) and cloud proxy 324 verifies the username and password to find the user (e.g., 348). The end user can input the username and passcode received via email to pass the authentication and gain access (e.g., access 350) to server 342. This provides enhanced authentication and security as compared to the workaround solutions discussed above.

In an example, the illustrated process can be simplified by saving the passcode and finding out the user by the special FQDN (no user input is needed at all). The FQDN can be updated in a short period by updating the PAC in case the FQDN got intercepted. In an example, an enhancement can be provided by using SSL Encrypted Client Hello (ECH) to encrypt the SNI, but it will need the extra effort to maintain a DNS service.

FIG. 4 illustrates an example flow diagram of an approach to providing endpoint client authentication and application access control in a secure web proxy zero-trust network access (ZTNA) environment.

In an example, a secure session is generated with a secure web proxy based on a request from a browser that requests access to a server, 402. In an example, the secure session is a Secure Socket Layer (SSL) or Transport Layer Security (TLS) compliant secure session. In an example, the generation of the secure session involves handshake protocols (e.g., SSL handshake). Other security protocols can also be used.

In an example, a secure tunnel is established between the secure web proxy and the browser, 404.

In an example, a web proxy address is generated corresponding to the user, 406. In an example, the web proxy address is a Fully Qualified Domain Name (FQDN). Other addressing approaches can also be used.

In an example, the user is identified based on a handshake procedure with the secure web proxy, 408. In an example, the user is identified by parsing out a user identifier (ID) from a server name indication (SNI) during the handshake procedure between a browser being used by the user and the secure web proxy.

In an example, a temporary passcode is generated for the user to be used for access to the server, 410. In an example, the temporary passcode is generated in response to the authentication of the user. In an example, authenticating the user to allow access to the server involves using a HyperText Transfer Protocol (HTTP) Basic authentication.

In an example, the temporary passcode is sent to an email address associated with the user, 412.

In an example, the server is caused to authenticate the user utilizing the temporary passcode to allow the user access to the server if the temporary passcode is approved, 414. In an example, the access to the server is based on a session-based authentication that is authenticated using security assertion markup language (SAML)-based authentication.

FIG. 5 is an example of a system to provide endpoint client authentication and application access control in a secure web proxy zero-trust network access (ZTNA) environment. In an example, system 502 can include processor (s) 504 and non-transitory computer-readable storage medium 506. Non-transitory computer-readable storage medium 506 may store instructions 508, 510, 512, 514, 516, 518 and 520 that, when executed by processor(s) 504, cause processor(s) 504 to perform various functions. Examples of processor(s) 504 may include a microcontroller, a micro-controller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of non-transitory computer-readable storage medium 506 include tangible media such as random-access memory (RAM), read-only memory (ROM), electrically erasable programmable read-only memory (EE-PROM), flash memory, a hard disk drive, etc.

Instructions 508 cause processor(s) 504 to generate a secure session with a secure web proxy based on a request from a browser, wherein the request corresponds to a user and requests access to a server. In an example, the secure session is a Secure Socket Layer (SSL) or Transport Layer Security (TLS) compliant secure session. In an example, the generation of the secure session involves handshake protocols (e.g., SSL handshake). Other security protocols can also be used.

Instructions 510 cause processor(s) 504 to establish a secure tunnel between the secure web proxy and the browser.

Instructions 512 cause processor(s) 504 to generate a web proxy address corresponding to the user. In an example, the web proxy address is a Fully Qualified Domain Name (FQDN). Other addressing approaches can also be used.

Instructions 514 cause processor(s) 504 to identify the user based on a handshake procedure with the secure web proxy. In an example, the user is identified by parsing out a user identifier (ID) from a server name indication (SNI) during the handshake procedure between a browser being used by the user and the secure web proxy.

Instructions 516 cause processor(s) 504 to generate a temporary passcode for the user to be used for access to the server. In an example, the temporary passcode is generated in response to the authentication of the user. In an example, authenticating the user to allow access to the server involves using a HyperText Transfer Protocol (HTTP) Basic authentication.

Instructions 518 cause processor(s) 504 to send the temporary passcode to an email address associated with the user.

Instructions 520 cause processor(s) 504 to cause the server to authenticate the user utilizing the temporary passcode to allow the user access to the server if the temporary passcode is approved. In an example, the access to the server is based on a session-based authentication that is authenticated using security assertion markup language (SAML)-based authentication.

FIG. 6 illustrates an example flow diagram of an approach to providing endpoint client authentication and application access control in a secure cloud portal service zero-trust network access (ZTNA) environment.

In an example, a secure session is generated with a secure web proxy based on a request from a browser that requests access to a server, 602. In an example, the secure session is a Secure Socket Layer (SSL) or Transport Layer Security (TLS) compliant secure session. In an example, the generation of the secure session involves handshake protocols (e.g., SSL handshake). Other security protocols can also be used.

In an example, at least a portion of a handshake procedure is performed between the browser and the secure cloud portal service, and the secure cloud portal service redirects the browser to an identity provider, 604.

In an example, the user is authenticated, 606. In an example, the user authentication is a security assertion markup language (SAML)-based authentication.

In an example, a web proxy address is generated for the user, 608. In an example, a portion of the web proxy address maps to a username corresponding to the user. In an example, the web proxy address is a Fully Qualified Domain Name (FQDN).

In an example, the web proxy address is provided to the browser, 610.

In an example, the user is identified based on a second handshake procedure with the secure cloud portal service, 612. In an example, the second handshake protocol does not allow for deep inspection.

In an example, a temporary passcode is generated for the user to be used for access to the server, 614.

In an example, the temporary passcode is sent to an email address associated with the user, 616.

In an example, the server is caused to authenticate the user utilizing the temporary passcode to allow the user access to the server if the temporary passcode is approved, 618. In an example, a user identifier (ID) is parsed out from a server name indication (SNI) during the handshake procedure between a browser being used by the user and the secure web proxy.

FIG. 7 is an example of a system to provide endpoint client authentication and application access control in a secure cloud portal service zero-trust network access (ZTNA) environment. In an example, system 702 can include processor(s) 704 and non-transitory computer-readable storage medium 706. Non-transitory computer-readable storage medium 706 may store instructions 708, 710, 712, 714, 716, 718 and 420 that, when executed by processor(s) 704, cause processor(s) 704 to perform various functions. Examples of processor(s) 704 may include a microcontroller, a microcontroller, a microprocessor, a CPU, a GPU, a DPU, an ASIC, a FPGA, a SoC, etc. Examples of non-transitory computer-readable storage medium 706 include tangible media such as RAM, ROM, EEPROM, flash memory, a hard disk drive, etc.

Instructions 708 cause processor(s) 704 to generate a secure session with a secure web proxy based on a request from a browser, wherein the request corresponds to a user and requests access to a server. In an example, the secure session is a Secure Socket Layer (SSL) or Transport Layer Security (TLS) compliant secure session. In an example, the generation of the secure session involves handshake protocols (e.g., SSL handshake). Other security protocols can also be used.

Instructions 710 cause processor(s) 704 to perform at least a portion of a handshake procedure between the browser and the secure cloud portal service, wherein the secure cloud portal service redirects the browser to an identity provider.

Instructions 712 cause processor(s) 704 to authenticate the user. In an example, the user authentication is a security assertion markup language (SAML)-based authentication.

Instructions 714 cause processor(s) 704 to generate a web proxy address for the user, wherein a portion of the web proxy address maps to a username corresponding to the user. In an example, the web proxy address is a Fully Qualified Domain Name (FQDN).

Instructions 716 cause processor(s) 704 to provide the web proxy address to the browser.

Instructions 718 cause processor(s) 704 to identify the user based on a second handshake procedure with the secure cloud portal service, wherein the second handshake protocol does not allow for deep inspection.

Instructions 720 cause processor(s) 704 to generate a temporary passcode for the user to be used for access to the server.

Instructions 722 cause processor(s) 704 to send the temporary passcode to an email address associated with the user.

Instructions 724 cause processor(s) 704 to cause the server to authenticate the user utilizing the temporary passcode to allow the user access to the server if the temporary passcode is approved. In an example, a user identifier (ID) is parsed out from a server name indication (SNI) during the handshake procedure between a browser being used by the user and the secure web proxy.

Figure 8:
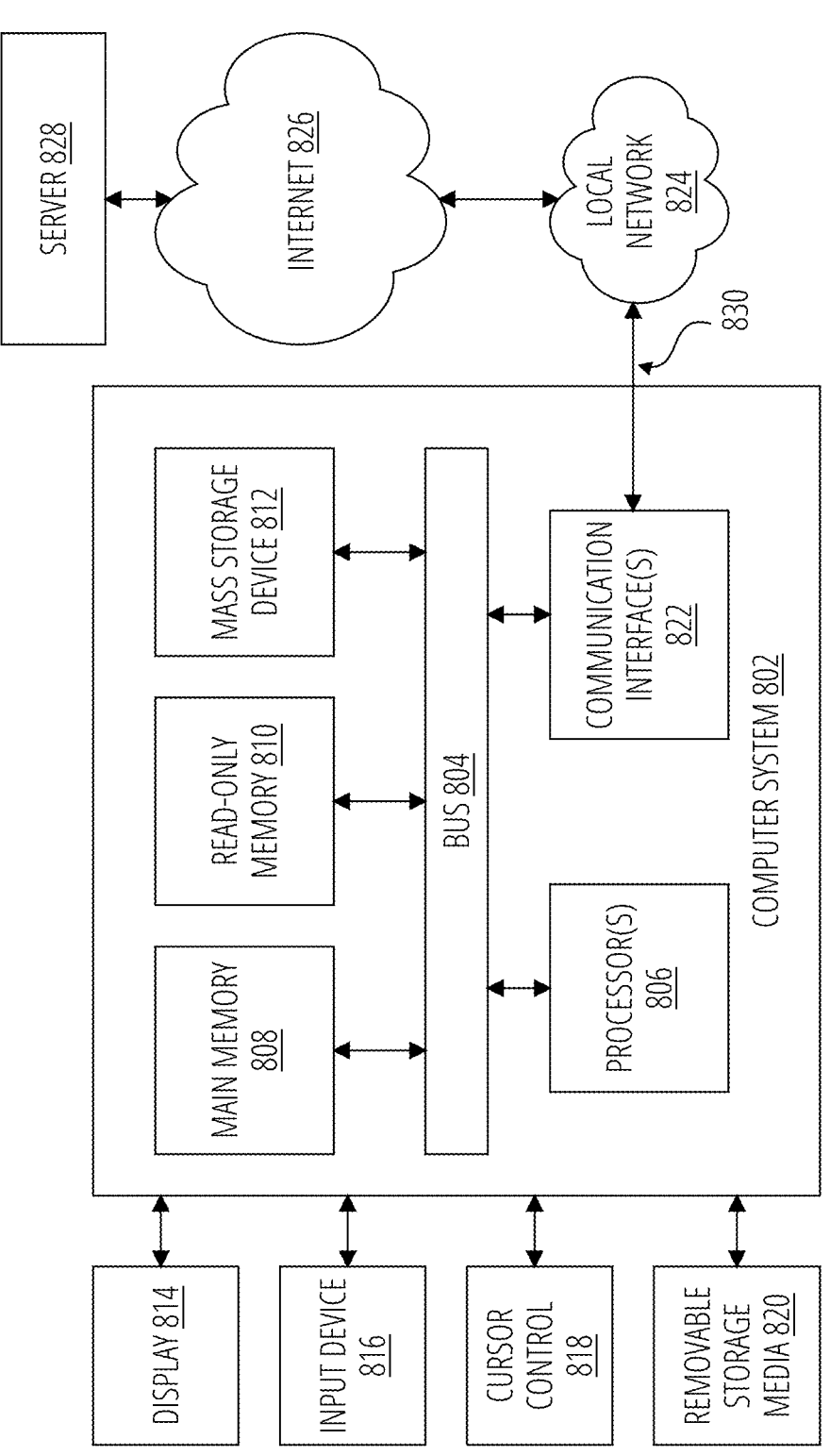
FIG. 8 is a block diagram that illustrates a computer system in which or with which an embodiment of the present disclosure may be implemented.

FIG. 8 is a block diagram that illustrates a computer system in which or with which an embodiment of the present disclosure may be implemented. Computer system 802 may be representative of an endpoint or client device (e.g., one of the off-net clients or on-net clients) on which an endpoint security agent is running and acting as a proxy on behalf of a client application (e.g., a browser). Notably, components of computer system 802 described herein are meant only to exemplify various possibilities. In no way should example computer system 802 limit the scope of the present disclosure. In the context of the present example, computer system 802 includes bus 804 or other communication mechanism for communicating information and one or more processing resources (e.g., one or more hardware processor(s) 806) coupled with bus 804 for processing information. Hardware processor(s) 806 may include, for example, one or more general-purpose microprocessors available from one or more current or future microprocessor manufacturers (e.g., Intel Corporation, Advanced Micro Devices, Inc., and/or the like) and/or one or more special-purpose processors (e.g., CPs, NPs, and/or accelerators or co-processors). In some examples, one or more processing resources may be part of an ASIC-based security processing unit (e.g., the FORTISP family of security processing units available from Fortinet, Inc. of Sunnyvale, CA).

Computer system 802 also includes main memory 808, such as a random-access memory (RAM) or other dynamic storage device, coupled to bus 804 for storing information and instructions to be executed by processor(s) 806. Main memory 808 also may be used for storing temporary variables or other intermediate information during execution of instructions to be executed by processor(s) 806. Such instructions, when stored in non-transitory storage media accessible to processor(s) 806, render computer system 802 into a special-purpose machine customized to perform the operations specified in the instructions.

Computer system 802 includes a read-only memory 810 or other static storage device coupled to bus 804 for storing static information and instructions for processor(s) 806. Mass storage device 812 (e.g., a magnetic disk, optical disk or flash disk (made of flash memory chips), is provided and coupled to bus 804 for storing information and instructions.

Computer system 802 may be coupled via bus 804 to display 814 (e.g., a cathode ray tube (CRT), Liquid Crystal Display (LCD), Organic Light-Emitting Diode Display (OLED), Digital Light Processing Display (DLP) or the like, for displaying information to a computer user. Input device 816, including alphanumeric and other keys, is coupled to bus 804 for communicating information and command selections to processor(s) 806. Another type of user input device is cursor control 818, such as a mouse, a trackball, a trackpad, or cursor direction keys for communicating direction information and command selections to processor(s) 806 and for controlling cursor movement on display 814. This input device typically has two degrees of freedom in two axes, a first axis (e.g., x) and a second axis (e.g., y), that allows the device to specify positions in a plane.

Removable storage media 820 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 802 may implement the techniques described herein using customized hard-wired logic, one or more ASICs or FPGAs, firmware or program logic which in combination with the computer system causes or programs computer system 802 to be a special-purpose machine. According to one embodiment, the techniques herein are performed by computer system 802 in response to processor(s) 806 executing one or more sequences of one or more instructions contained in main memory 808. Such instructions may be read into main memory 808 from another storage medium, such as mass storage device 812. Execution of the sequences of instructions contained in main memory 808 causes processor(s) 806 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic, or flash disks, such as mass storage device 812. Volatile media includes dynamic memory, such as main memory 808. Common forms of storage media include, for example, a flexible disk, a hard disk, a solid-state drive, a magnetic tape, or any other magnetic data storage medium, a CD-ROM, any other optical data storage medium, a physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wires, and fiber optics, including the wires that comprise bus 804. Transmission media can also be acoustic or light waves, such as those generated during radio-wave and infrared data communications.

Various forms of media may be involved in carrying one or more sequences of one or more instructions to processor(s) 806 for execution. For example, the instructions may initially be carried on a magnetic disk or solid-state drive of a remote computer. The remote computer can load the instructions into its dynamic memory and send the instructions over a telephone line using a modem. A modem local to computer system 802 can receive the data on the telephone line and use an infra-red transmitter to convert the data to an infra-red signal. An infra-red detector can receive the data from the infra-red signal, and appropriate circuitry can place the data on bus 804. Bus 804 carries the data to main memory 808, from which processor(s) 806 retrieve and execute the instructions. The instructions received by main memory 808 may optionally be stored on mass storage device 812 either before or after execution by processor(s) 806.

Computer system 802 also includes communication interface(s) 822 coupled to bus 804. Communication interface(s) 822 provides a two-way data communication coupling to network link 830 that is connected to local network 824. For example, communication interface(s) 822 may be an integrated services digital network (ISDN) card, cable modem, satellite modem, or a modem to provide a data communication connection to a corresponding type of telephone line. Another example is communication interface(s) 822, which may be a local area network (LAN) card that provides a data communication connection to a compatible LAN. Wireless links may also be implemented. In any such implementation, communication interface(s) 822 sends and receives electrical, electromagnetic or optical signals that carry digital data streams representing various types of information.

Network link 830 typically provides data communication through one or more networks to other data devices. Local network 824 and internet 826 both use electrical, electromagnetic or optical signals that carry digital data streams. The signals through the various networks and network link 830 and through communication interface(s) 822, which carry the digital data to and from computer system 802, are example forms of transmission media.

Computer system 802 can send messages and receive data, including program code, through the network(s), network link 830 and communication interface(s) 822. In the Internet example, server 828 might transmit a requested code for an application program through internet 826, local network 824 and communication interface(s) 822. The received code may be executed by processor(s) 806 as it is received or stored in mass storage device 212 or other non-volatile storage for later execution.

Embodiments may be implemented as any or a combination of one or more microchips or integrated circuits interconnected using a parent board, hardwired logic, software stored by a memory device and executed by a microprocessor, firmware, an application-specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include but is not limited to, floppy diskettes, optical disks, CD-ROMs (Compact Disc-Read Only Memories), magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown, nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as the following claims.

Reference in the specification to "one example" or "an example" means that a particular feature, structure, or characteristic described in connection with the example is included in at least one embodiment of the disclosure. The appearances of the phrase "in one example" in various places in the specification do not necessarily refer to the same embodiment.

It is contemplated that any number and type of components may be added to and/or removed to facilitate various embodiments, including adding, removing, and/or enhancing certain features. For brevity, clarity, and case of understanding, many standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

The terms "component," "module," "system," and the like as used herein are intended to refer to a computer-related entity, either software-executing general-purpose processor, hardware, firmware, or a combination thereof. For example, a component may be, but is not limited to, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer-readable media with various data structures stored thereon. The components may communicate via local and/or remote processes, such as in accordance with a signal having one or more data packets (e.g., data from one component interacting with another component in a local system, distributed system, and/or across a network such as the Internet with other systems via the signal).

Computer-executable components can be stored, for example, on non-transitory, computer-readable media including, but not limited to, an ASIC, CD, DVD, ROM, floppy disk, hard disk, EEPROM, memory stick or any other storage device type, in accordance with the claimed subject matter.

What is claimed is:

1. A non-transitory computer-readable medium having stored thereon instructions that, when executed by one or more hardware processors, are configurable to cause the one or more hardware processors to:

generate a secure session with a secure web proxy based on a request from a browser, wherein the request corresponds to a user and requests access to a server;
establish a secure tunnel between the secure web proxy and the browser;
generate a web proxy address corresponding to the user;
identify the user based on a handshake procedure with the secure web proxy;
generate a temporary passcode for the user to be used for access to the server;
send the temporary passcode to an email address associated with the user; and
cause the server to authenticate the user utilizing the temporary passcode to allow the user access to the server if the temporary passcode is approved.

2. The non-transitory computer-readable medium of claim 1 further comprising instructions that, when executed by the one or more hardware processors, are configurable to cause the one or more hardware processors to grant access to the server in response to authentication of the user based on the temporary passcode.

3. The non-transitory computer-readable medium of claim 1, wherein the secure session comprises a Secure Socket Layer (SSL) or Transport Layer Security (TLS) compliant secure session.

4. The non-transitory computer-readable medium of claim 1, wherein the web proxy address comprises a Fully Qualified Domain Name (FQDN).

5. The non-transitory computer-readable medium of claim 1, wherein identifying the user comprises parsing out a user identifier (ID) from a server name indication (SNI) during the handshake procedure between a browser being used by the user and the secure web proxy.

6. The non-transitory computer-readable medium of claim 1, wherein authenticating the user to allow access to the server comprises using a HyperText Transfer Protocol (HTTP) Basic authentication.

7. The non-transitory computer-readable medium of claim 1, wherein the access to the server is based on a session-based authentication that is authenticated using security assertion markup language (SAML)-based authentication.

8. A system comprising:

one or more storage devices;
one or more hardware processors coupled with the one or more storage devices, the one or more hardware processors configurable to:
generate a secure session with a secure web proxy based on a request from a browser, wherein the request corresponds to a user and requests access to a server;
establish a secure tunnel between the secure web proxy and the browser;
generate a web proxy address corresponding to the user;
identify the user based on a handshake procedure with the secure web proxy;
generate a temporary passcode for the user to be used for access to the server;
send the temporary passcode to an email address associated with the user; and
cause the server to authenticate the user utilizing the temporary passcode to allow the user access to the server if the temporary passcode is approved.

9. The system of claim 8, wherein the one or more hardware processors are configurable to grant access to the server in response to authentication of the user based on the temporary passcode.

10. The system of claim 8, wherein the secure session comprises a Secure Socket Layer (SSL) or Transport Layer Security (TLS) compliant secure session.

11. The system of claim 8, wherein the web proxy address comprises a Fully Qualified Domain Name (FQDN).

12. The system of claim 8, wherein identifying the user comprises parsing out a user identifier (ID) from a server name indication (SNI) during the handshake procedure between a browser being used by the user and the secure web proxy.

13. The system of claim 8, wherein authenticating the user to allow access to the server comprises using a HyperText Transfer Protocol (HTTP) Basic authentication.

14. The system of claim 8, wherein the access to the server is based on a session-based authentication that is authenticated using security assertion markup language (SAML)-based authentication.

15. A non-transitory computer-readable medium having stored thereon instructions that, when executed by one or more hardware processors, are configurable to cause the one or more hardware processors to:

generate a secure session with a secure cloud portal service based on a request from a browser, wherein the request corresponds to a user and requests access to a server;

perform at least a portion of a handshake procedure between the browser and the secure cloud portal service, wherein the secure cloud portal service redirects the browser to an identity provider;

authenticate the user;

generate a web proxy address for the user, wherein a portion of the web proxy address maps to a username corresponding to the user;

provide the web proxy address to the browser;

identify the user based on a second handshake procedure with the secure cloud portal service, wherein the second handshake protocol does not allow for deep inspection;

generate a temporary passcode for the user to be used for access to the server;

send the temporary passcode to an email address associated with the user; and cause the server to authenticate the user utilizing the temporary passcode to allow the user access to the server if the temporary passcode is approved.

16. The non-transitory computer-readable medium of claim 15 further comprising instructions that, when executed by the one or more hardware processors, are configurable to cause the one or more hardware processors to grant access to the server in response to authentication of the user based on the temporary passcode.

17. The non-transitory computer-readable medium of claim 15, wherein the handshake procedure comprises a Secure Socket Layer (SSL) or Transport Layer Security (TLS) compliant handshake procedure.

18. The non-transitory computer-readable medium of claim 15, wherein the user authentication comprises a security assertion markup language (SAML)-based authentication.

19. The non-transitory computer-readable medium of claim 15, wherein the web proxy address comprises a Fully Qualified Domain Name (FQDN).

20. The non-transitory computer-readable medium of claim 15, wherein identifying the user comprises parsing out a user identifier (ID) from a server name indication (SNI) during the handshake procedure between a browser being used by the user and the secure web proxy.

\* \* \* \* \*